(12) United States Patent
Kim et al.

(10) Patent No.: US 7,246,147 B2
(45) Date of Patent: Jul. 17, 2007

(54) UPLOAD AND RETRIEVAL BY AN IMAGE DEVICE OF A SCANNED IMAGE TO AND FROM A WEB FILE SERVER

(75) Inventors: Joohae Kim, Aliso Viejo, CA (US); Dan Danknick, Orange, CA (US); Marianne Kodimer, Huntington Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/356,579

(22) Filed: Feb. 3, 2003

(65) Prior Publication Data

US 2003/0120729 A1 Jun. 26, 2003

Related U.S. Application Data

(63) Continuation of application No. 08/908,544, filed on Aug. 7, 1997, now abandoned.

(51) Int. Cl.
*G06F 13/00* (2006.01)
(52) U.S. Cl. ...................................................... 709/203
(58) Field of Classification Search ................ 709/200, 709/203, 206, 207, 204, 205, 201, 250
See application file for complete search history.

(56) References Cited

U.S. PATENT DOCUMENTS

| | | | | |
|---|---|---|---|---|
| 4,941,170 A | 7/1990 | Herbst | ......................... | 379/100 |
| 5,090,049 A | 2/1992 | Chen | ........................... | 379/100 |
| 5,351,136 A | 9/1994 | Wu et al. | ................... | 358/440 |
| 5,406,557 A | 4/1995 | Baudoin | ....................... | 370/61 |
| 5,461,488 A | 10/1995 | Witek | .......................... | 358/402 |
| 5,479,411 A | 12/1995 | Klein | ....................... | 370/110.1 |
| 5,509,074 A | 4/1996 | Choudhury et al. | .......... | 380/23 |
| 5,513,126 A | 4/1996 | Harkins et al. | ............. | 364/514 |
| 5,521,719 A | 5/1996 | Yamada | ...................... | 358/438 |
| 5,530,852 A | 6/1996 | Meske, Jr. et al. | .......... | 395/600 |
| 5,530,904 A | 6/1996 | Koga | .......................... | 395/872 |
| 5,544,045 A | 8/1996 | Garland et al. | ........ | 364/419.03 |
| 5,570,465 A | 10/1996 | Tsakanikas | .................. | 395/114 |
| 5,572,581 A | 11/1996 | Sattar et al. | ................. | 379/201 |

(Continued)

OTHER PUBLICATIONS

Shari A. Estes "Shari's Homepage" (http://www.afn.org/~afn26559) (Apr. 22, 1996).*

*Primary Examiner*—Robert B. Harrell
(74) *Attorney, Agent, or Firm*—Fitzpatrick, Cella, Harper & Scinto

(57) ABSTRACT

An HTTP server for an image input device is provided in which when an image is input and a file for the image is created for access by the server, an HTML link to the file is automatically generated by which a web browser can retrieve the file over a TCP/IP network. An HTTP server for an image input device is provided, in which an identification code is obtained for an image file created for an image input by the image input device. An HTML page which includes an HTML link to the image file created for the input image is automatically generated upon receipt by the server of a TCP/IP packet which includes a request to retrieve an identified web page, the identified web page having a predetermined relationship to the identification code for the image file. A TCP/IP packet which includes the generated HTML page is caused to be sent over a TCP/IP network.

15 Claims, 16 Drawing Sheets

U.S. PATENT DOCUMENTS

| | | | |
|---|---|---|---|
| 5,675,507 A | 10/1997 | Bobo, II | 364/514 |
| 5,870,549 A | 2/1999 | Bobo, II | 395/200.36 |
| 5,893,127 A * | 4/1999 | Tyan et al. | 715/513 |
| 5,898,836 A | 4/1999 | Freivald et al. | 395/200.48 |
| 6,012,090 A | 1/2000 | Chung et al. | 709/219 |
| 6,018,774 A * | 1/2000 | Mayle et al. | 709/250 |
| 6,041,357 A | 3/2000 | Kunzelman et al. | 709/228 |

* cited by examiner

```
<HTML>
<HEAD>
<TITLE> DAN.21963 </TITLE>
</HEAD>
<TABLE BORDER>
<TR>
<TD>
<A HREF="HTTP://WWW.COMPANY.COM/SERVER/SCANNER/DAN.21963/0
001.GIF"><IMG SRC="DAN.21963/0001T.GIF"></A>
<A HREF="HTTP://WWW.COMPANY.COM/SERVER/SCANNER/DAN.21963/0
001.GIF"><0001></A>
<TD>
<A HREF="HTTP://WWW.COMPANY.COM/SERVER/SCANNER/DAN.21963/0
002.GIF"><IMG SRC="DAN.21963/0002T.GIF"></A>
<A HREF="HTTP://WWW.COMPANY.COM/SERVER/SCANNER/DAN.21963/0
002.GIF"><0002></A>
</TR>
</TABLE>
</HTML>
```

```
<TD>
<A HREF="HTTP://WWW.COMPANY.COM/SERVER/SCANNER/DAN.21963/5
555.GIF"><IMG SRC="DAN.21963/5555T.GIF"></A>
<A HREF="HTTP://WWW.COMPANY.COM/SERVER/SCANNER/DAN.21963/5
555.GIF"><5555></A>
```

```
     ┌<HTML>
     │<HEAD>
201 ─┤<TITLE> DAN.21963 </TITLE>
     │</HEAD>
     └<TABLE BORDER>
     ┌<TR>
     │<TD>
202 ─┤<A HREF="HTTP://WWW.COMPANY.COM/SERVER/SCANNER/DAN.21963/0
     │001.GIF"><IMG SRC="DAN.21963/0001T.GIF"></A>
     │<A HREF="HTTP://WWW.COMPANY.COM/SERVER/SCANNER/DAN.21963/0
     └001.GIF"><0001></A>
     ┌<TD>
     │<A HREF="HTTP://WWW.COMPANY.COM/SERVER/SCANNER/DAN.21963/0
204 ─┤002.GIF"><IMG SRC="DAN.21963/0002T.GIF"></A>
     │<A HREF="HTTP://WWW.COMPANY.COM/SERVER/SCANNER/DAN.21963/0
     └002.GIF"><0002></A>
     ┌<TD>
     │<A HREF="HTTP://WWW.COMPANY.COM/SERVER/SCANNER/DAN.21963/5
     │555.GIF"><IMG SRC="DAN.21963/5555T.GIF"></A>
205 ─┤<A HREF="HTTP://WWW.COMPANY.COM/SERVER/SCANNER/DAN.21963/5
     │555.GIF"><5555></A>
     └</TR>
209 ─┬</TABLE>
     └</HTML>
```

FIG. 7C

UPLOAD AND RETRIEVAL BY AN IMAGE DEVICE OF A SCANNED IMAGE TO AND FROM A WEB FILE SERVER

This application is a continuation of application Ser. No. 08/908,544, filed Aug. 7, 1997 now abandoned.

BACKGROUND OF THE INVENTION

1. Field of the Invention

The present invention relates to an HTTP server, and specifically to an HTTP server for use with a facsimile or scanner or other image input device, in which when an image is input and a file for the image is created, an HTML link to the file is automatically generated by which a remote web browser can retrieve the file through the HTTP server over a TCP/IP network.

2. Description of the Related Art

Use of electronic image input devices, such as scanners, facsimile machines, digital cameras and video cameras, has become increasingly common in recent years. As their use has increased, different techniques have been utilized for distributing image files created by each different type of image input device.

For example, a scanner scans a paper copy of an original document to generate a computerized image file which contains digital binary or multilevel image data representative of the document. Conventionally, the image file is input to a computer workstation and then stored either on the workstation's hard drive or on a computer diskette. Storage on a computer workstation, however, severely limits the accessibility of the scanned image. That is, in order to retrieve the scanned image, a user must physically go to that particular workstation or physically obtain the computer diskette.

Another conventional technique for distributing a scanned image file is to use the workstation to store the file in a directory on a file server which is connected to the same local area network (LAN) as the workstation. In this way, assuming appropriate read access has been granted by the user who created the file, other workstations on the same LAN can also retrieve the scanned image file. Although this technique somewhat increases the pool of users who can easily retrieve the file, as well as the number locations from which it can be retrieved, it too has significant limitations.

One limitation is that a user generally must be on the same LAN as the file server. Thus, for example, a user might only be able to retrieve the file while in his office, but not while at home or while travelling. In addition, it might be desirable to share the file with other people who are geographically distant from the LAN or simply do not have access to it. However, delivering such image files to remote users conventionally has been relatively difficult. Finally, whoever accesses the image file must know the exact name and location of the file on the file server.

Similarly, when a facsimile machine receives a facsimile transmission of a document, one conventional method for distributing the document is to print the document on paper and than manually distribute the paper copy to the intended recipient. Such a distribution system is relatively cumbersome and often results in significant delays between when the facsimile document is received by the facsimile machine and when the paper copy of the document actually reaches the recipient.

An electronic technique for distribution of incoming facsimile documents has recently been proposed. According to this technique, upon receipt of an incoming facsimile transmission, a file containing the facsimile data is created in a commonly accessible or shared directory in a file server.

Although the foregoing technique eliminates problems associated with printing and manually distributing facsimile documents, it also has the problems described above, one of which is the need to know the exact name and location of the file on the file server, before access to the file can be obtained.

SUMMARY OF THE INVENTION

It is therefore an object of the present invention to address the foregoing problems of the prior art by providing an HTTP server which, when an image is input and a file for the image is created, will automatically generate an HTML link to the file.

Thus, according to one aspect, the invention provides an HTTP server for an image input device such as a scanner or facsimile which, when a document is input and a file for the document is created, automatically generates an HTML link to the file by which a web browser, interfacing with the HTTP server, can retrieve the file over a TCP/IP network.

Preferably, the HTTP server is located co-extensively with the input device. For example, an HTTP server can be configured on the same microcomputer that controls other imaging operations of the image input device, or it can be configured on a microcomputer that interfaces the image input device to a network. The HTML link can be generated on-the-fly, i.e., when a user's web browser requests information from the HTTP server, or the HTML link can be generated and stored in an appropriate one of the HTML pages used by the server, such as the DEFAULT.HTM or INDEX.HTM page, for later use.

By virtue of the foregoing arrangement, once an image file is input, the present invention can permit it to be retrieved easily. No special software other than a ubiquitous internet browser is needed to retrieve, view, manipulate, store, forward, or otherwise process the image file. Since the file is linked by an HTML link, the user need not know the name and location of the file. Thus, if the HTTP server is accessible over an intranet, anyone connected to the intranet (which typically provides company-wide access) can easily obtain the image file through point-and-click use of his internet browser. If the HTTP server is accessible over the World Wide Web, the input image file can be retrieved over the internet from almost anywhere in the world. In addition, since only a web browser is required to retrieve the input image file, the file can be retrieved using a relatively inexpensive and low power network computer, regardless of whether the internet or an intranet is used. The foregoing arrangement can also permit cross-platform access to the image file without regard to the platform on which a user is operating. Moreover, by providing an HTML link to the image file, the foregoing arrangement can permit a large number of users to easily retrieve the image file without significant effort on the user's part.

According to more particularized aspects of the foregoing arrangement, structure is provided for logically organizing all of a particular user's, or even a group of users', input images, permitting a form of centralized storage for easy access.

According to another aspect, the invention provides an HTTP server for an image input device in which an identification code is obtained for an image file created for an image input by the image input device. An HTML page which includes an HTML link to the image file created for the input image is automatically generated upon receipt by the server of a TCP/IP packet which includes a request to retrieve an identified web page, the identified web page having a predetermined relationship to the identification code for the image file. A TCP/IP packet which includes the generated HTML page is caused to be sent over a TCP/IP network.

By virtue of the foregoing arrangement, HTML pages do not need to be stored, but instead can be generated as requests are received. Moreover, since a new page is generated based on a received request, the foregoing arrangement permits a great degree of flexibility in selecting how and what links are to be provided.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 7A, 7B, and 7C illustrate sample HTML code for generation of a web page according to the invention.

DETAILED DESCRIPTION OF THE PREFERRED EMBODIMENTS

Figure 1:
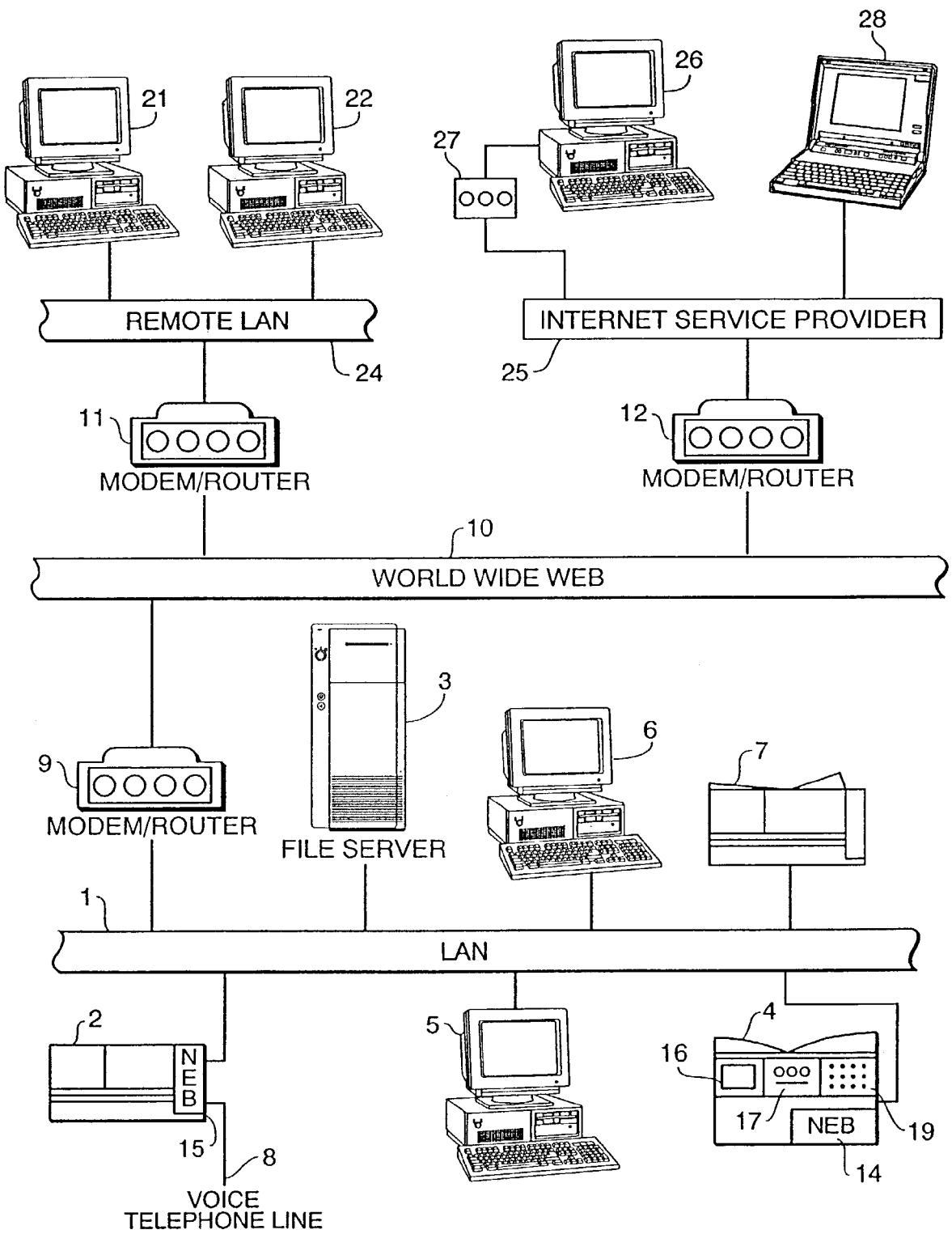
FIG. 1 is a diagram of a network architecture which can be used in connection with the present invention.

FIG. 1 is a simplified diagram of a network architecture which will be used to explain benefits and the operation of the present invention. Included in FIG. 1 is local area network (LAN) 1 to which are interfaced a facsimile machine 2, file server 3, scanner 4, workstations 5 and 6, and printer 7. One of the workstations, such as workstation 6, may be designated for use as the network administrator. The facsimile machine 2 and the scanner 4 are interfaced to LAN 1 via respective network expansion boards ("NEBs") 14 and 15.

LAN 1 is also connected to World Wide Web 10 via router 9, and supports data packets transmitted according to the TCP/IP network protocol (IP-packets). Each IP-packet includes a destination field indicating the network address of the intended recipient, a source field indicating the network address of the sender, a data field, a field indicating the length of the data field, and a check sum field for error detection. The router 9 primarily provides LAN 1 with web monitoring functions, routing IP-packets intended for devices on LAN 1 to LAN 1 and discarding all others, and placing IP-Packets generated by devices on LAN 1 onto Web 10 when appropriate.

Also connected to Web 10, at separate locations which usually are physically remote from that of LAN 1, are router 11, which provides workstations 21 and 22 with access to Web 10 via LAN 24, and router 12, which connects internet service provider 25 to Web 10. Internet service provider 25, in turn, provides access to Web 10 to various users via modem connections. Thus, workstation 26 connects to Web 10 via internet service provider 25 by establishing a modem connection using modem 27. Similarly, laptop 28 can access Web 10 by establishing a modem connection to internet service provider 25 using an internal modem (not shown).

Broadly speaking, NEBs 14 and 15 are interactive network devices which interface a peripheral to LAN 1, making the peripheral a responsive and interactive network member. For example, NEB 14 receives status and image information requests, as well as control commands from LAN 1. NEB 14 transmits the status requests and control commands to scanner 4 for execution, and transmits responsive status information from scanner 4 back to LAN 1. Image information requests are handled in NEB 14 by accessing image and information files in scanner 4, as described more fully below, and then transmitting the requested image information back to LAN 1. Thus, NEB 14 can permit not only remote status inquiries and controls over scanner 4, but can also offer remote users access to image information generated by scanner 4.

Figure 2:
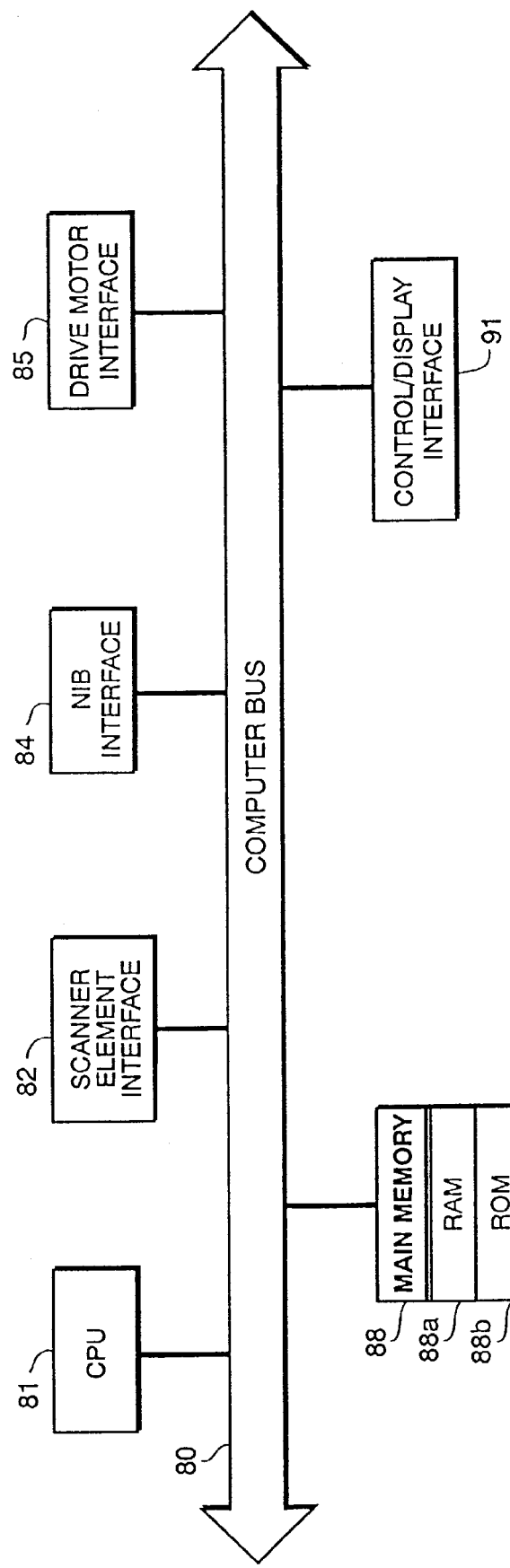
FIG. 2 is a block diagram of a scanner used in the first embodiment of the invention.

FIG. 2 is a block diagram of scanner 4. As shown in FIG. 2, scanner 4 has an open architecture which includes a central processing unit 81 interfaced with computer bus 80. Also interfaced with computer bus 80 is scanning element interface 82, NEB interface 84, scanner drive motor interface 85, main memory 88 and control/display interface 91. Specifically, control/display interface 91 provides an interface to display 16, control panel 17 and keypad 19 (all shown in FIG. 1), which together provide a user interface.

Memory 88 includes a RAM portion 88a and a ROM portion 88b. ROM 88b stores various executable software modules, such as scanning software for controlling scanning operations, user interface software for driving the scanner user interface and graphic format converter software for converting bitmap images to graphic format. RAM 88a interfaces with computer bus 80 so as to provide random access memory storage for use by CPU 81 while executing stored process steps.

Scanner 4 electronically scans hard copies of documents to generate binary or multilevel, color or gray scale, image files. The format of the image files may be raster ("bitmap") or compressed through lossless (e.g., LZW) or lossy (e.g., JPEG) compression. Upon generation, the image files are transferred to NEB 14 for storage thereby, for example on file server 3 via LAN 1.

Figure 3:
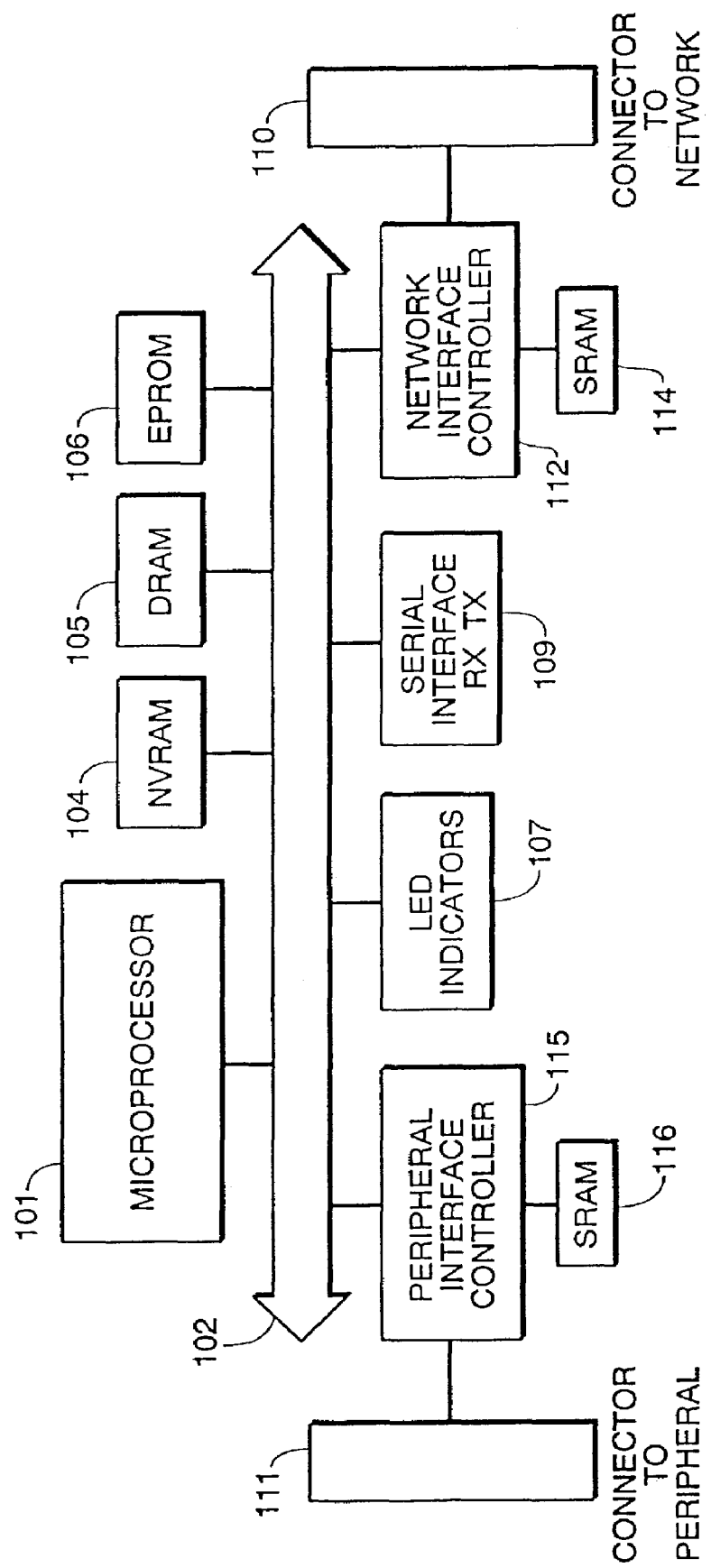
FIG. 3 is a block diagram of a network expansion board for implementing the invention.

FIG. 3 is a high level block diagram of NEBs 14 and 15 (individually referred to herein as the NEB). When implementing the present invention, the precise hardware construction of the NEB is of less importance than the software construction, which is described below. A block diagram of a suitable hardware construction for the NEB is shown in FIG. 3. As shown in FIG. 3, the NEB includes a central processing unit (CPU) 101 such as an Intel 80C188EA-20 8-bit programmable microprocessor, which is interfaced to computer bus 102. Also interfaced to computer bus 102 is non-volatile RAM (NVRAM) 104, dynamic RAM (DRAM) 105, electrically erasable programmable read-only memory (EPROM) 106, drivers for LED indicators 107, and a serial interface 109 which includes both a transmit and a receive terminal. Configuration parameters and other information that must be stored between power cycles are stored in NVRAM 104. Process steps for execution by microprocessor 11 are stored in EPROM 106, but in general before the process steps are executed, they are copied from EPROM 106 into DRAM 105 for execution out of DRAM 105. LED indicators 107 are provided so as to give a user a general indication as to the processing status of the NEB and may, for example, include indicator LEDs for power and data communication. Serial interface 109 is provided so as to allow local serial access to the NEB.

As mentioned previously, the NEB interfaces between the local area network and the peripheral, and is therefore provided with a connector 110 for connecting to the LAN as well as connector 111 for connecting to the peripheral. A network interface controller 112, which is connected to bus 102 and to network connector 110, provides hardware interface for capturing and assembling data packets for receipt from and transmission onto the LAN, and also provides a hardware interrupt to microprocessor 101 so as to signal that LAN data packets have been captured and are available for use by the microprocessor. Static RAM (SRAM) 114 is provided for network interface controller 112 so as to store, on a temporary basis, such data packets.

On the peripheral side, a peripheral interface controller 115, which is connected to bus 102 and peripheral connector 111, provides peripheral interface between the NEB and the peripheral serviced by the NEB. Peripheral interface controller 115 may be any of a variety of different controllers and can, for example, be constructed in a bi-directional interface (such as with a SCSI interface, an IEEE-1284 interface, a dual port RAM interface, a shared RAM interface, and the like). Peripheral interface controller 115 is provided with SRAM 116 for temporary storage of data transmitted to and from the NEB and the peripheral serviced by the NEB.

Figure 4:
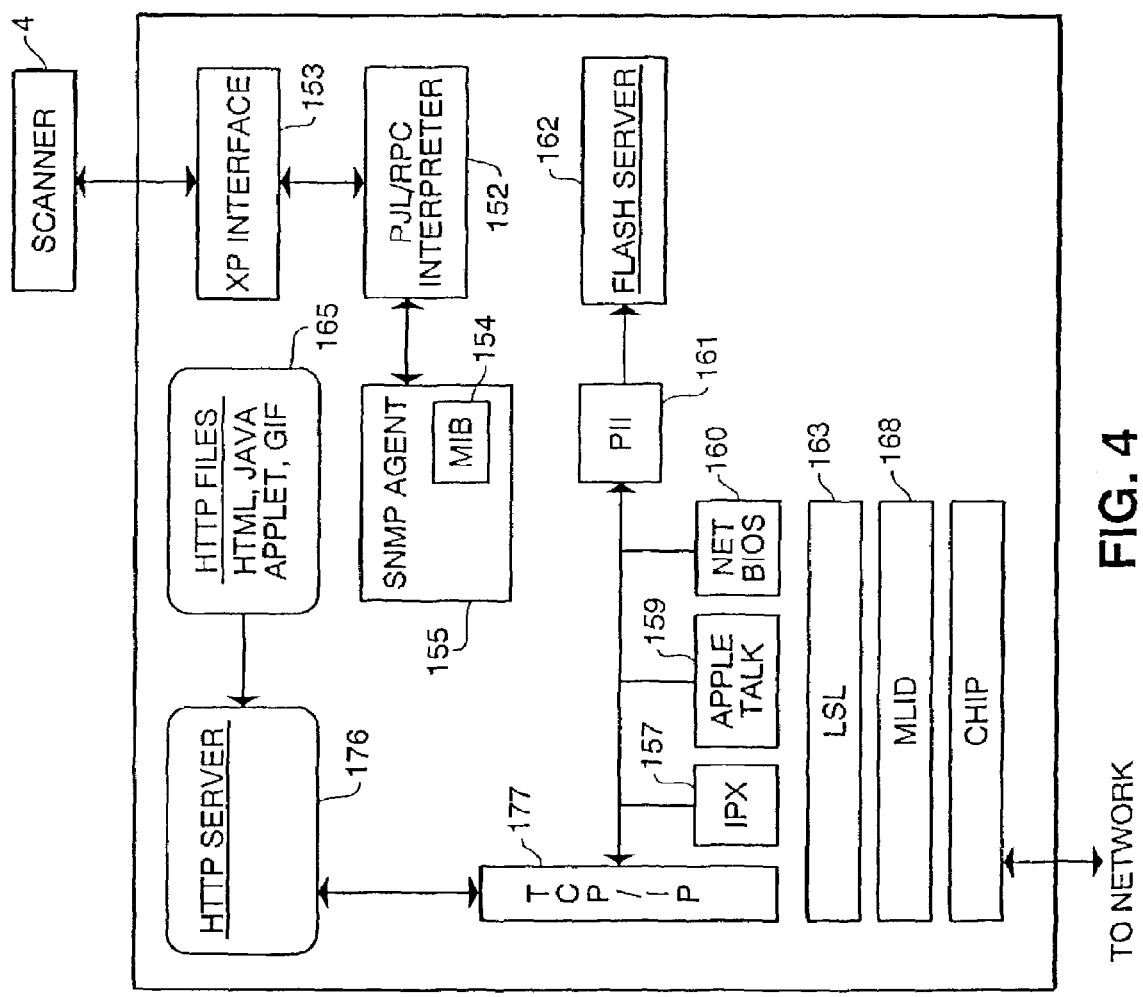
FIG. 4 is a functional block diagram of a network expansion board.

FIG. 4 is a functional block diagram of NEB 14, with functionality of FIG. 4 being realized by operation of CPU 101 when executing program code instructions stored in DRAM 105. Referring to FIG. 4, XP interface module 153 provides a standardized interface between scanner 4 and NEB 14. MLID (Multi Link Interface Driver) 168 is a piece of code (Media Support Module, or MSM) linked together with a piece of customized code (Hardware Support Module, or HSM) that is the lowest level of connection to LAN 1. The LSL (Link Support Layer) 163 is a piece of code that acts as a multiplexer between the low-level MLID 168 and the TCP/IP protocol stack 177, the Novell IPX® protocol stack 157, the AppleTalk® protocol stack 159, and the NetBIOS® protocol stack 160 above it.

The Protocol Independent Interface (PII) module 161 provides a single interface for communication via the various supported protocols. Because NEB 14 supports multiple protocol stacks, this module exists as long as NEB 14 is running. Flash server 162 is used to reprogram EPROM 106. PII module 161 works in conjunction with flash server 162 to monitor and support the various protocol stacks.

NEB 14 also supports a Hyper Text Transfer Protocol (HTTP) server 176 which enables workstations connected to LAN 1 or having access to Web 10 to access NEB 14 using a web browser which supports HTTP protocol. Accordingly, NEB 14 also contains files which may be passed to such a web browser according to HTTP protocol, such as Hyper Text Markup Language (HTML) files, JAVA Applets, or Graphics Interchange Format (GIF) files.

In addition, NEB 14 provides scanner 4 with a Simple Network Management Protocol (SNMP) agent 155 for exchanging monitoring and control data between scanner 4 and workstations 5 and 6. Agent 155 returns information contained in a Management Information Base 154, which is a data structure that defines what information can be obtained from scanner 4 and what aspects of scanner 4 can be controlled. NEB 14 includes an PJL/RPC interpreter 152 to interface between the SNMP agent 155 and the XP interface 153.

Since the NEB is attached to an image input device, it is not necessary that NEBs 14 and 15 include printer control functionality that normally might be associated with network expansion boards. Moreover, even the image input device control functionality described above for NEBs 14 and 15 is not strictly necessary to the invention. Thus, for example, in other embodiments each of NEBs 14 and 15 might be replaced by a "web box" which provides an HTTP server or similar functionality for use by its respective facsimile machine or scanner.

First Embodiment

The invention will now be described with respect to a representative first embodiment employing scanner 4 and NEB 14. Briefly, according to this embodiment scanner 4 scans in a document, generates an image file for the document, outputs the generated image file for storage, and then provides the storage information, together with an identification code provided during scanning, to NEB 14. Automatically, based on the received identification code, NEB 14 then retrieves the appropriate HTML page from among a group of previously stored HTML pages, and updates the retrieved HTML page to include a link to the newly stored image file. Upon receipt of a request which includes the identification code, NEB 14 retrieves the HTML page containing the link to the scanned document, and then generates and sends to the requester a TCP/IP packet including the HTML page containing the link, together with links to other image files corresponding to documents previously scanned for the same user. When displayed, by simply clicking on a link, a request will be initiated for the full image file, and the full image file returned.

Figure 5:
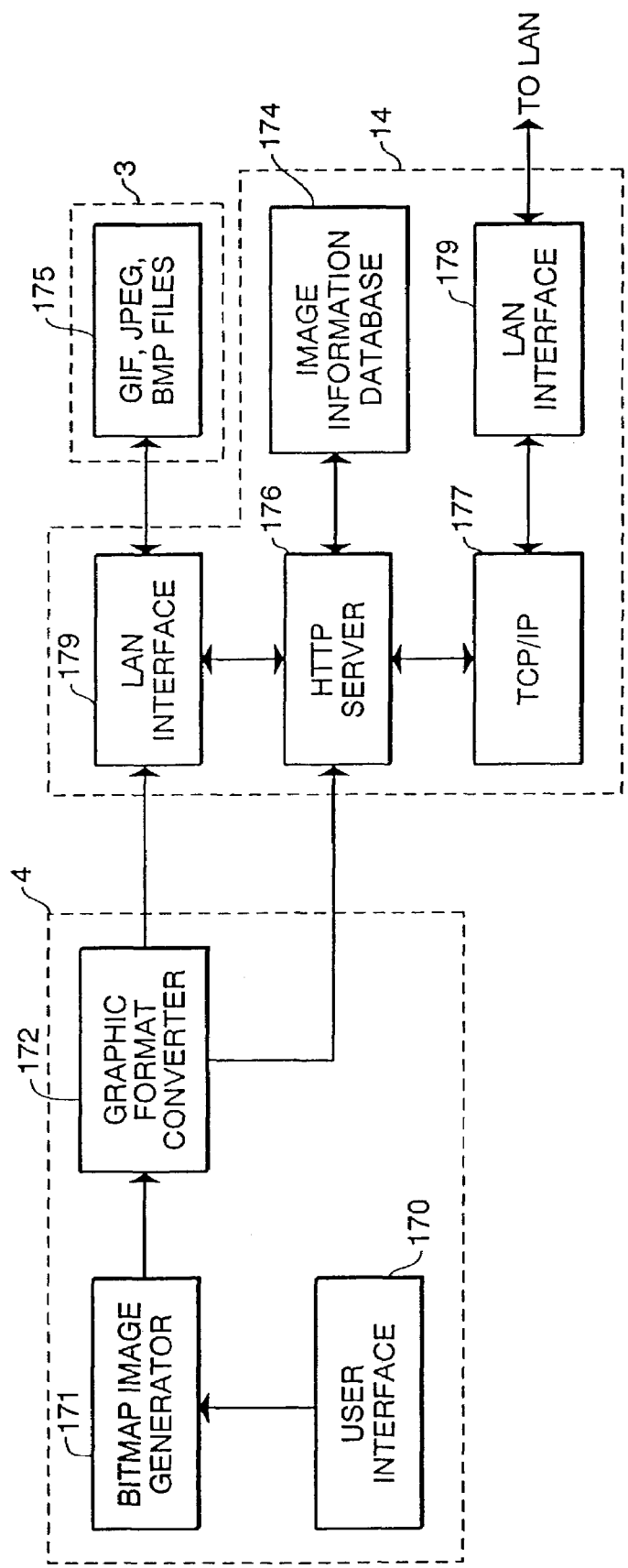
FIG. 5 is a functional block diagram of the first embodiment of the invention.

FIG. 5 is a functional block diagram of the first embodiment of the invention. Referring to FIG. 5, scanner 4 includes user interface module 170 which in the present embodiment drives display 16, obtains user specified information via control panel 17 and keypad 19, and provides the obtained information to bitmap image generator 171. Alternatively, user interface 170 might retrieve such information from a workstation, such as workstation 5 or 6, via LAN 1.

Based on the user specified information, bitmap image generator 171, which is part of the scanning software in scanner 4, generates a bitmap image corresponding to a scanned document and outputs it to graphic format converter 172.

Graphic format converter 172 then is executed by scanner 4 to convert the generated bitmap image data to graphic format, to output the resulting graphic image files to NEB 14 for storage in file server 3, and to output the identification code and storage information for those files to NEB 14. More specifically, user interface 170, bitmap image generator 171, and graphic format converter 172, are modules consisting of computer executable process steps, which are stored in and executed out of ROM 88b in scanner 4.

Upon receipt of a signal indicating that a new image file has been stored, HTTP server 176 in NEB 14 retrieves and updates an HTML page, and updates information database 174, described in detail below. Upon receipt of a web page request over LAN 1 via TCP/IP protocol module 177 and LAN interface 179, HTTP server 176 accesses information stored in image information database 174 and on file server 3 in order to respond to those requests, and retrieves and transmits any requested web pages or files over LAN 1 via TCP/IP protocol module 177 and LAN interface 179. Each of HTTP server 176, TCP/IP protocol module 177 and LAN interface 179 is stored in and executed from EPROM 106 by CPU 101 in NEB 14. More specifically, LAN interface 179 includes LSL 163 and MLID 168. The functions of each of the foregoing modules are explained in more detail in connection with the descriptions of the flow diagrams in FIGS. 6 and 7.

Figure 10A:
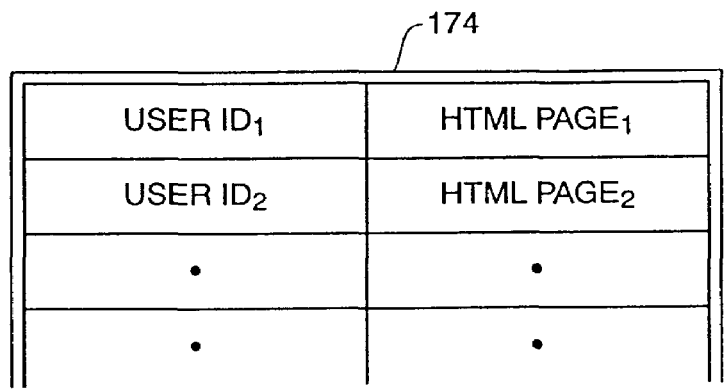
FIGS. 10A and 10B illustrate information databases used in the invention.

Image information database 174 is stored in NVRAM 104 on NEB 14, but also may be downloaded into DRAM 105 from file server 3. FIG. 10A illustrates the contents of image information database 174 for the first embodiment of the invention. As shown in FIG. 10A, database 174 includes multiple user objects, each of which includes a user identification code and an HTML page. In this embodiment, the user identification code consists of the user name and password. Rather than including the full HTML page in the user object, the user identification code might be stored with a pointer to the location of the corresponding HTML page in database 174.

Figure 6:
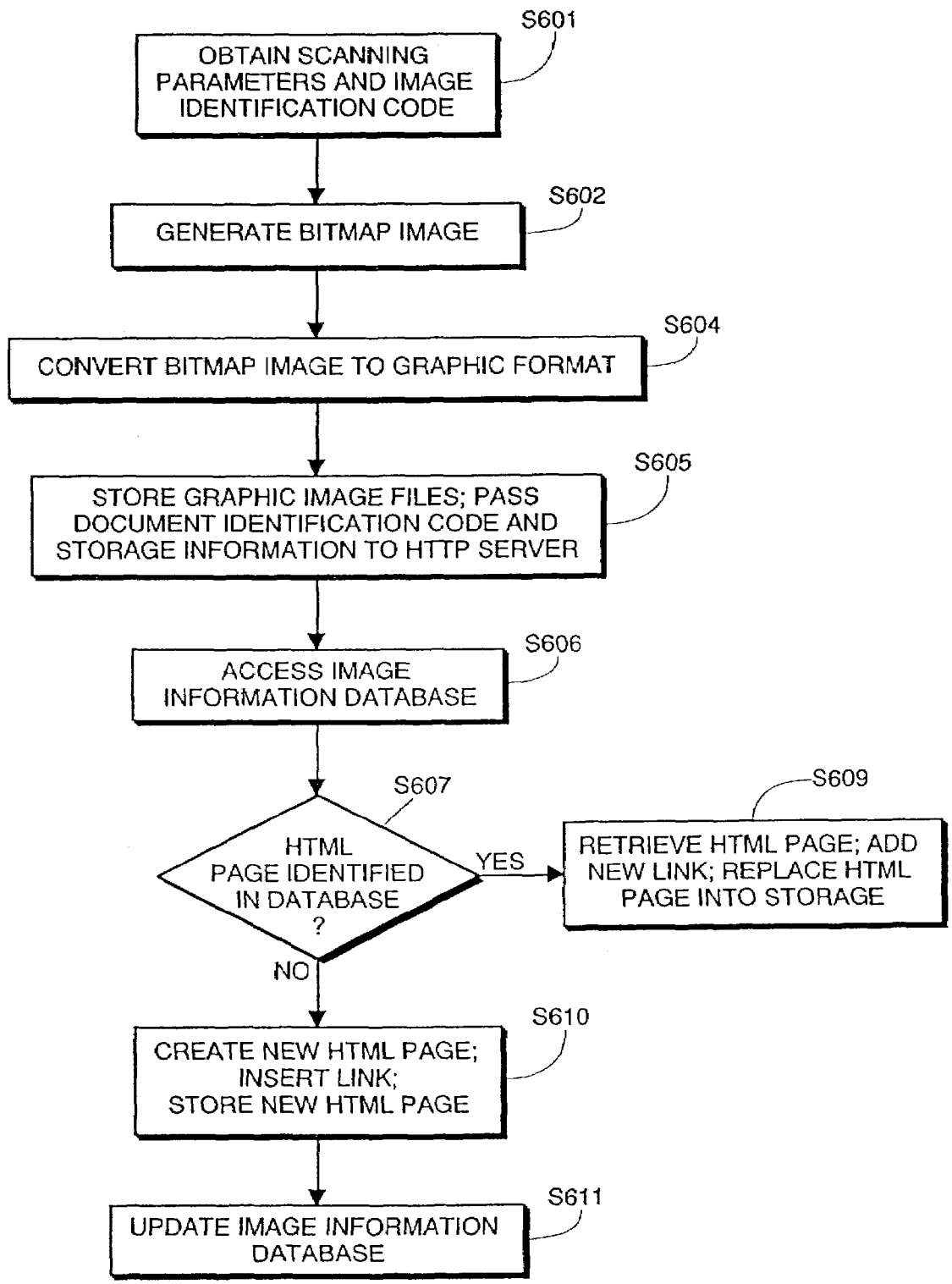
FIG. 6 is a flow diagram illustrating processing which occurs when a document is scanned according to the first embodiment of the invention.

FIG. 6 is a flow diagram illustrating processing which occurs when a document is scanned according to the first embodiment of the invention. Briefly, according to FIG. 6, scanning parameters and an image identification code are obtained based on user inputs, a bitmap image is generated, graphic image files are generated based on the bitmap image, the generated graphic image files are stored, and the image information database is updated based on the image identification code.

More specifically, in step S601 user interface module 170 effects communication with a user via display 16, control panel 17 and keypad 19 (shown in FIG. 1) to obtain various scanning parameters, such as resolution and color/black-only. In addition, user interface module 170 also accepts, via keypad 133, an identification code to be assigned to the scanned document. As noted above, in other embodiments, interface module 170 might instead obtain this information over LAN 1, for example from workstation 5 or 6.

Preferably, the identification code includes a user identification portion, which includes a user name and password, and a document identification portion. The document identification portion serves to distinguish the scanned document from other scanned documents, and if not input by the user can be automatically supplied by user interface module 170.

In this embodiment, user interface module 170 assigns consecutive integer numbers to consecutive documents for the same user. However, it is also possible for user interface module 170 to use different systems for document identification, such as assigning to each document the date and time that the document was scanned.

User interface module 170 passes the input scanning parameters and identification code (including any document identification portion assigned by user interface module 170) to bitmap image generator 171.

In step S602, based on the scanning parameters supplied by user interface module 170, bitmap image generator 171 effects a scanning of an input document in order to generate a bitmap image of the document. That bitmap image, together with the identification code, is then passed to graphic format converter 172.

In step S604, graphic format converter 172 preferably creates two GIF image files based on the input bitmap image. One such file corresponds to the full scanned document and the other corresponds to a thumbnail image of the first page of the scanned document. Graphic format conversion is not strictly necessary, but can serve to reduce storage requirements and transmission times. In addition, in alternative embodiments, other formats such as JPEG might be used.

In step S605, graphic format converter 172 outputs the newly created GIF files to NEB 14 which stores the GIF files in a volume created on file server 3, together with other GIF files for use by HTTP server 176. In this embodiment, the paths for the new files are selected in accordance with the identification code. For example, if the user name were "Dan", the password "21963" and the document identification "5555", the full image would be stored under the file name 5555.GIF in sub-directory Dan.21963, and the corresponding thumbnail image would be stored as 5555T.GIF in sub-directory Dan.21963. In addition, in this step graphic format converter 172 transfers the document identification code to the HTTP server 176. Since in this embodiment the file paths can be derived based solely on the identification code, it is unnecessary to transfer additional storage information.

In step S606, HTTP server 176 accesses its image information database 174 in an attempt to locate the HTML page corresponding to the document identification code.

In step S607, it is determined whether a corresponding HTML page has been identified in the database. If so, then processing proceeds to step S609.

In step S609, the identified HTML page is retrieved from the image information database, a new link corresponding to the newly stored image file is inserted into the HTML page, and the HTML page is replaced into the image information database. Actually, in the present embodiment, two links are added, one using the stored thumbnail image as an anchor, the other including a textual portion of the identification code as an anchor, both providing a link to the full image file.

In the present embodiment, the links are added simply by generating HTML code and inserting the generated HTML code in the appropriate place in a pre-existing HTML page, as described more fully below.

If it was determined in step S607 that no HTML page corresponded to the document identification code, then in step S610 a new HTML page is created which includes the link, and the new HTML page is then stored in image information database 174. Upon completion of step S610, processing proceeds to step S611 in which the image information database 174 is updated to reflect the creation of the new HTML page, as described below.

FIG. 7A illustrates an example of HTML code for an HTML page which is retrieved pursuant to the supplied identification code. In this example, the user name is "Dan", and the password is "21963". Also in this example, the HTML page retrieved corresponds to the user portion of the document identification code, and is titled "DAN.21963".

Since an HTML page was retrieved in this case, in step S609 a link corresponding to the new image file is created and added to the HTML page. The position to insert the new link is located by first scanning the HTML file to find the </TR> code which is closest to the end of the file. The file is then scanned to determine whether the current table row is full. If not, as here, the insertion point 190 is just above this code. Otherwise, it is just below the identified </TR> code.

Next, code for the new link is generated. In this case, the document identification number is 5555. This indicates that the full image has been stored at DAN.21963/5555.GIF, the thumbnail image of the first page has been stored at DAN.21963/5555T.GIF. Accordingly, the code shown in FIG. 7B is generated. In FIG. 7B, 191 is the HTML code for generating a link which uses the thumbnail image as the link and 192 is the code which uses "5555", the document ID, as the link.

If a new table row had been required, a <TR> code would have been included at the beginning and a </TR> code would have been placed at the end of the generated code. After the newly generated code is inserted into the HTML page, the HTML page is stored into image information database 174 so as to replace the prior version of that page.

To this point, modifying and maintaining HTML files based on the creation of new image files has been described. Now the current embodiment will be described with respect to how a user operating a web browser can retrieve those HTML files. Specifically, a web browser outputs IP-packets which contain requests for particular HTML pages.

Figure 8:
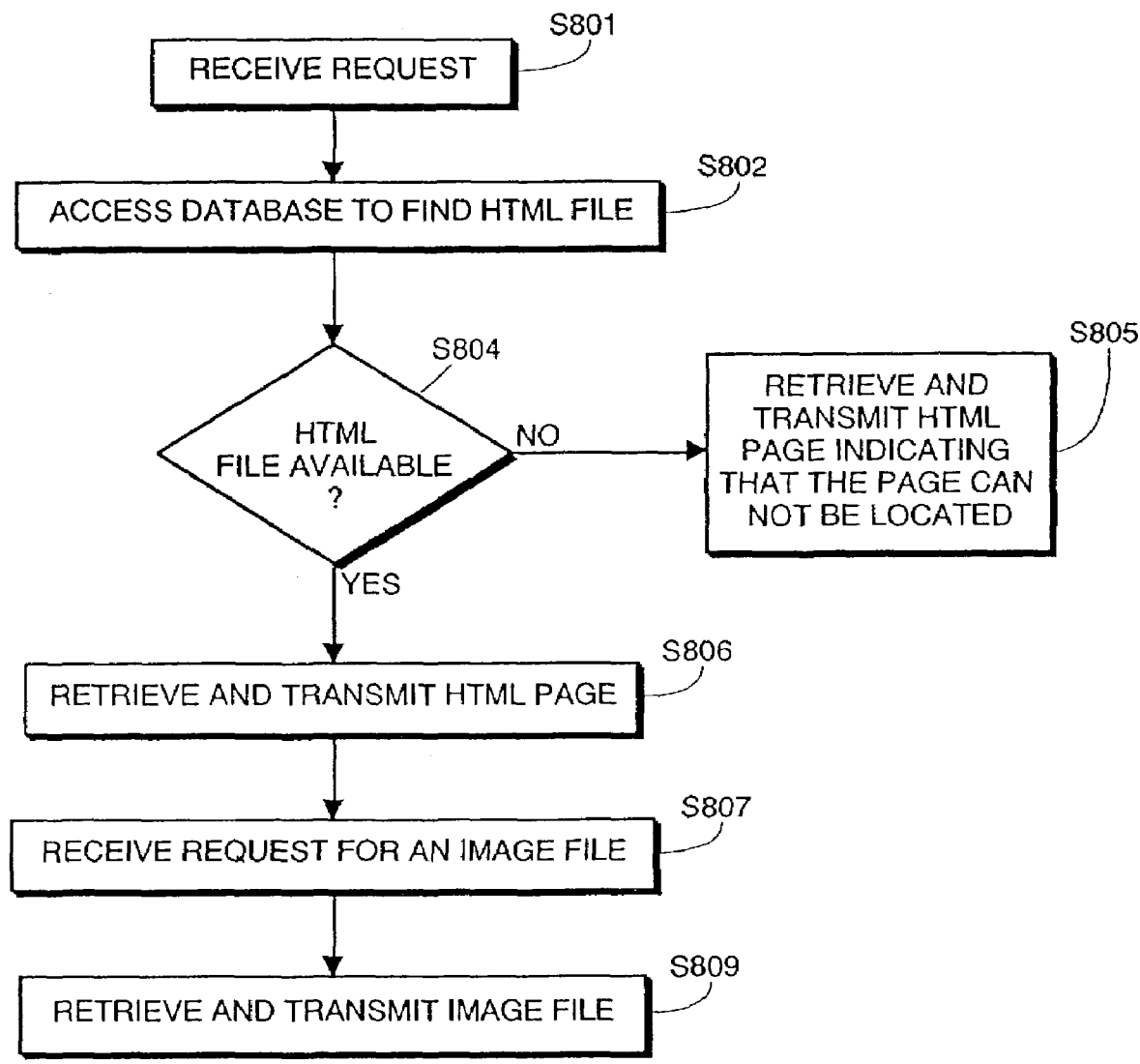
FIG. 8 is a flow diagram illustrating servicing of a web request according to the first embodiment of the invention.

Accordingly, processing for responding to such a request over a TCP/IP network will now be discussed with reference to FIGS. 5 and 8. FIG. 8 is a flow diagram illustrating servicing of a web request according to the first embodiment of the invention. Briefly, according to FIG. 8, a request for a particular HTML page is received, an attempt is made to locate an HTML page corresponding to the received request, the HTML page is then retrieved and transmitted; similarly, upon receipt of a request for an image file, the image file is retrieved and transmitted.

In more detail, in step S801, an IP-packet is received by NEB 14 from a remote web browser such as web browser at a workstation on LAN 1 or at a remote computer such as workstation 22 via the internet. The IP-packet data field includes a request to return a web page corresponding to documents input for a particular user. The request is transmitted to HTTP server 176 via the TCP/IP module 177 and LAN interface 179. The received request includes the name of the web page to be retrieved. In this embodiment, the web page name includes information identifying the user and the user's password.

In step S802, HTTP server 176 searches image information database 174 to attempt to locate the HTML page corresponding to the request.

In step S804, HTTP server 176 determines whether an HTML page was located in step S802. If not, then in step S805 HTTP server 176 retrieves and transmits to the address indicated in the source field of the IP-packet containing the request an HTML page merely indicating that the requested page can not be located. Otherwise, processing proceeds to step S806.

In step S806, HTTP server 176 retrieves the HTML page from image information database 174, and transmits the page via TCP/IP protocol module 177 and LAN interface 179 to LAN 1. More specifically, TCP/IP protocol module 177 creates an IP-packet containing the HTML page in its data field and the address from the source field of the request IP-packet in its destination field, and LAN interface 179 causes the IP-packet to be transmitted over LAN 1. Depending on the contents of the destination field of the IP-packet, the IP-packet is either routed to a recipient on LAN 1 or is placed on World Wide Web 10 by router 9, where it is ultimately routed to the web browser at its intended recipient.

Figure 9:
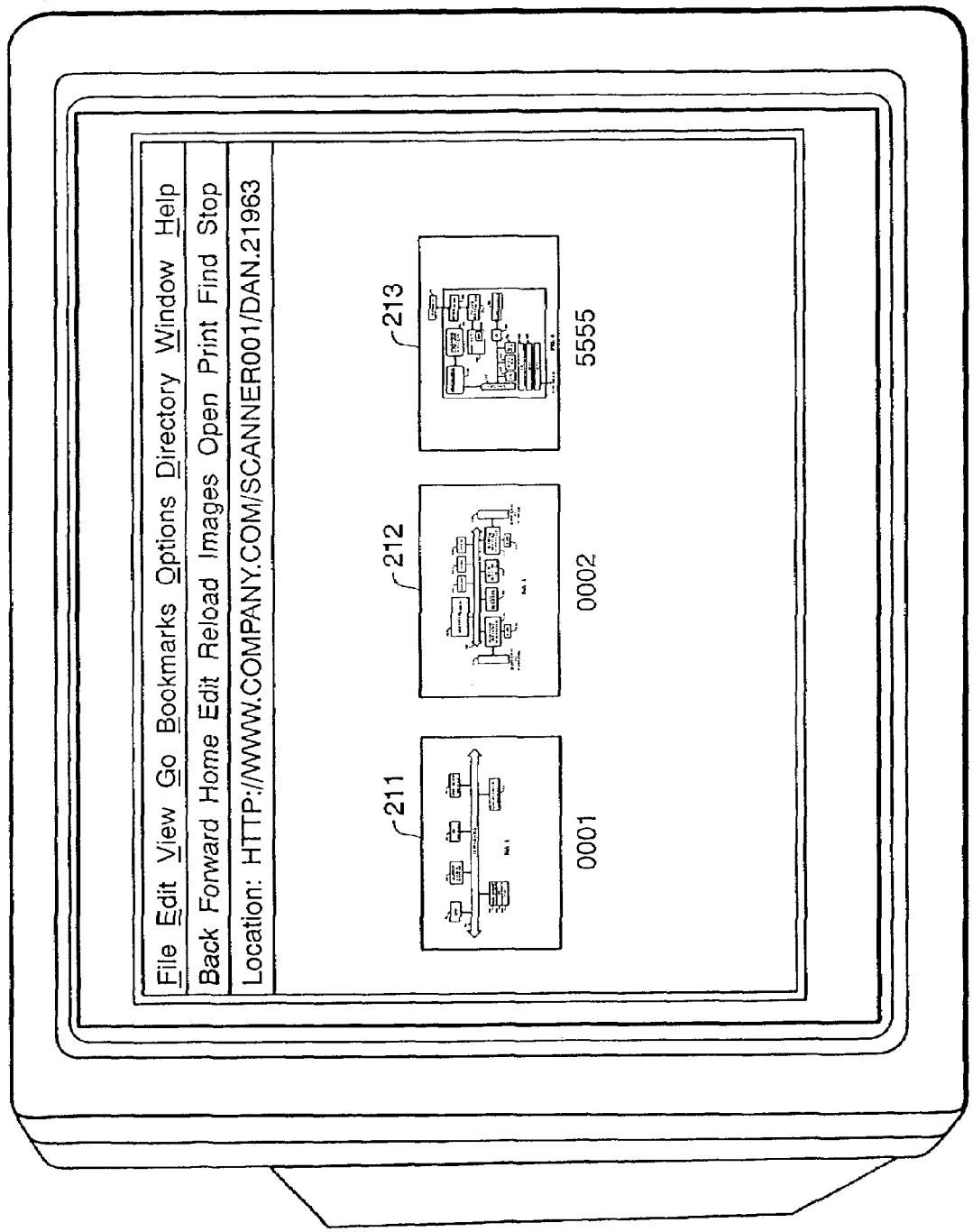
FIG. 9 illustrates a sample web page which might be retrieved based on HTML code transmitted pursuant to the invention.

When received by a web browser, the IP-packet generated according to the invention is read in order to display a web page including links to the image files corresponding to the user name and password embedded in the original request. FIG. 9 illustrates an example of how a web browser might display an HTML web page (DAN.21963) retrieved pursuant to the invention. Specifically, each of thumbnails 211, 212 and 213 corresponds to the first page of each scanned document where the provided user name was Dan and the provided password was 21963. When initially scanned, no document number was entered for the documents corresponding to thumbnails 211 and 212. Accordingly, in step S601 user interface module 170 automatically assigned those documents numbers 0001 and 0002, respectively. On the other hand, a document number (5555) was entered for the document corresponding to thumbnail 223, and is shown underneath thumbnail 213 in FIG. 9. Each of thumbnails 211, 212 and 213, together with its corresponding document number, provides a link to its respective full document. Accordingly, selecting one of those links (e.g., clicking on a thumbnail) will initiate transmission of an IP-packet containing a request to retrieve a web page including the full scanned-in document.

In step S807, HTTP server 176 receives a TCP/IP packet requesting the image file for the full scanned-in document, which is stored on file server 3. Accordingly, in step S809, HTTP server 176 retrieves the requested image file from file server 3, generates an IP packet containing the file, and transmits the IP-packet to the requester.

In the foregoing embodiment, existing HTML files are modified by adding new links when a document has been scanned and an image file created. However, it should be noted that this embodiment can also be implemented by generating new HTML files on-the-fly, as in the following embodiment Second Embodiment The second embodiment of the invention employs facsimile machine 2 and NEB 15. Specifically, in this embodiment HTML pages are not updated as new images are input, and in fact HTML images are not even stored at all. Rather, when a TCP/IP packet containing a request is received, the requested HTML page is generated on-the-fly. Also different from the first embodiment, this embodiment uses the facsimile features of facsimile machine 2 as the image input device, rather than a scanner.

Similar to the first embodiment, processing with respect to two separate events must be considered, i.e., when an image is input (in this case, receipt of a facsimile) and when a request generated HTML pages is received, for example over the internet. Briefly, according to this embodiment, facsimile machine 2 receives facsimile documents and stores them according to recipient information identified within the facsimile document. Upon receipt of a request over a TCP/IP network, the HTTP server automatically generates HTML code, including HTML links to those received facsimile documents which correspond to recipient and password information accompanying the request.

Figure 11:
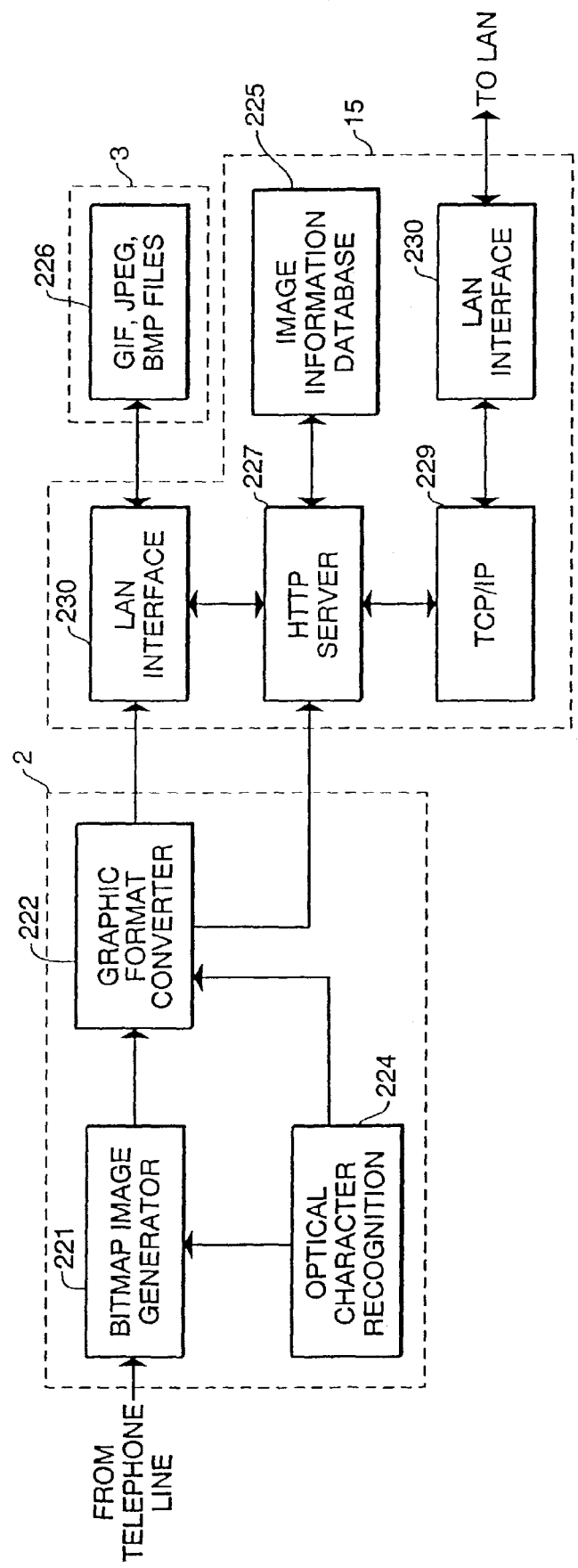
FIG. 11 is a functional block diagram of the second embodiment of the invention.

FIG. 11 is a functional block diagram of the second embodiment of the invention. Bitmap image generator 221, which is executed in facsimile machine 2, receives digital signals which have been converted from analog audio signals transmitted over voice telephone line 8. Bitmap image generator 221 generates and verifies hand shaking signals, performs error detection/correction, and then processes the data to obtain usable bitmap image data. Bitmap image generator 221 then passes the received bitmap image data to graphic format converter 222 and optical character recognition module 224.

Optical character recognition module 224 in facsimile machine 2 recognition processes header information in the input bitmap image data and outputs a recipient code to graphic format converter 222. Graphic format converter 222 in facsimile machine 2 converts bitmap image data to graphic format, stores graphic files in file server 3, and passes information regarding those files to HTTP server 227. Graphic format converter 222 also provides notification information to HTTP server 227 when a facsimile document has been received.

HTTP server 227, executing in NEB 15, inputs information stored in file server 3 and image information database 225, described below, and transmits and receives information over LAN 1 via TCP/IP protocol module 229 and LAN interface 230. The functions of each of the foregoing modules are explained in more detail in connection with the descriptions of the flow diagram in FIG. 12 below.

Figure 10B:
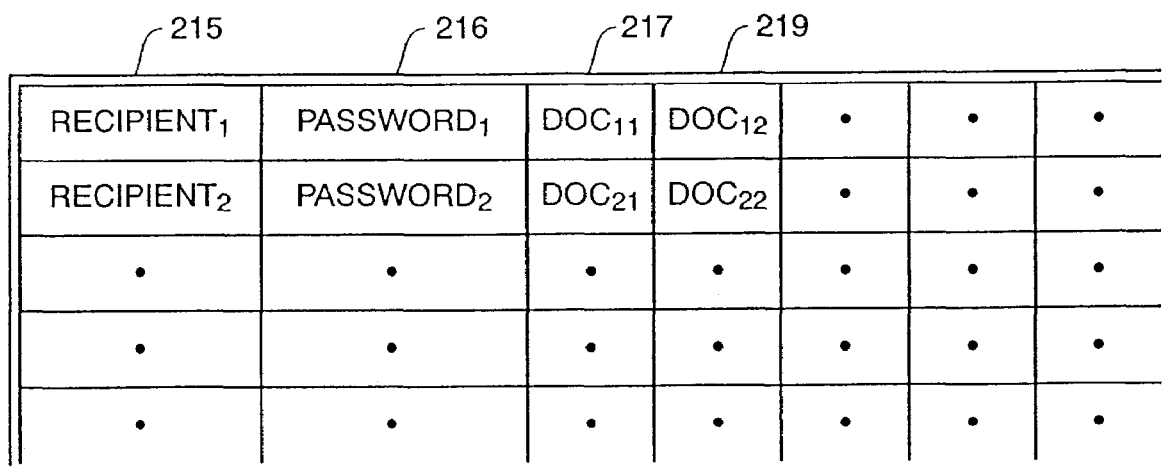

FIG. 10B illustrates the structure of image information database 225 in this embodiment. As shown in FIG. 10B each recipient code, such as recipient code 215, has associated with it a password, such as password 216, and one or more document IDs, such as 217 and 219. Each document ID refers to a different received facsimile document. As new facsimile documents for a recipient are received, new document ID entries are added for the corresponding recipient code.

Figure 12:
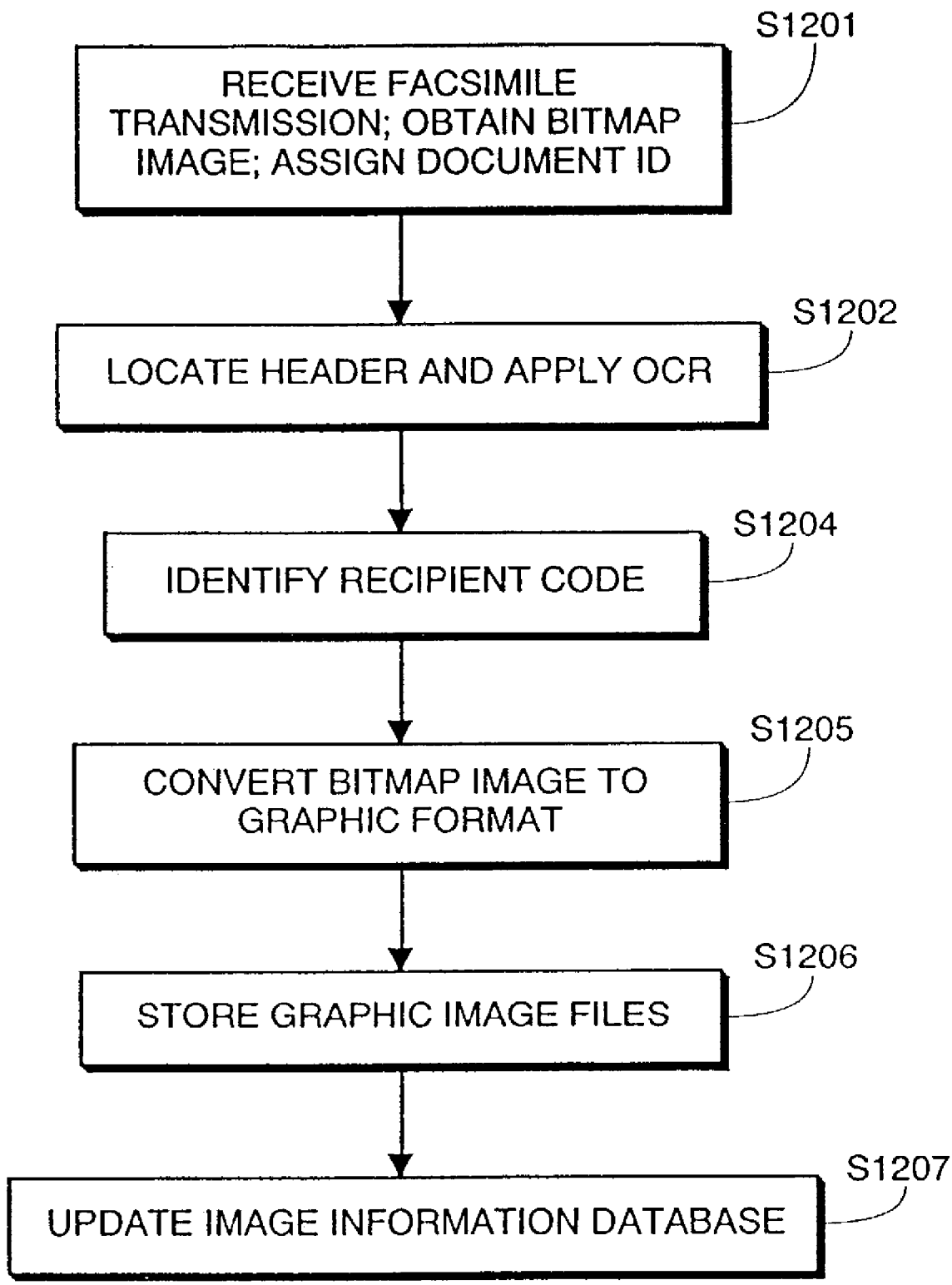
FIG. 12 is a flow diagram illustrating processing related to reception of a facsimile document according to the second embodiment of the invention.

FIG. 12 is a flow diagram illustrating processing related to reception of a facsimile document according to the second embodiment of the invention. Briefly, according to FIG. 12, a facsimile transmission is received and a bitmap image obtained. Header information in the bitmap image is then located and recognition processed. A recipient code is identified based on the recognition processing results. The bitmap image is then converted to full and thumbnail graphic files. The graphic image files are stored, and an information database is updated to reflect the new document.

More specifically, according to FIG. 12, in step S1201 bitmap image generator 221 receives a facsimile transmission, and from it obtains a bitmap image. Also in this step, bitmap image generator 221 assigns a document ID to the received facsimile document. In the present embodiment, the document ID is the date and time that the document was received. The bitmap image data is then passed from bitmap image generator 221 to optical character recognition module 224.

In step S1202, optical character recognition module 224 locates and then recognition processes header information in the bitmap image data using conventional recognition processing techniques in order to identify the intended recipient.

In step S1204, optical character recognition module 224 compares the recognition processed data against a stored list of recipient codes in order to obtain a recipient code for the received facsimile, and then outputs the recipient code to graphic format converter 222.

In step S1205, graphic format converter 222 creates two GIF files based on the received bitmap image data, one corresponding to a full image of the received document, the other to a thumbnail image of the first page of the received facsimile. As in the first embodiment, graphic format conversion is not strictly necessary, but can serve to reduce storage requirements and transmission times. In addition, in alternative embodiments, other formats such as JPEG might be used.

In step S1206, graphic format converter 222 stores the GIF file for the full image and the thumbnail image in file server 3 using a path derived from the recipient code and the assigned document ID. In addition, graphic format converter 222 passes the document ID and the recipient code to HTTP server 227.

In step S1207, HTTP server 227 updates image information database 225, in order to reflect the new input image. Specifically, HTTP server 227 locates the object in database 225 corresponding to the identified recipient code, and then creates a new entry within that object which identifies the two new graphic image files.

Figure 13:
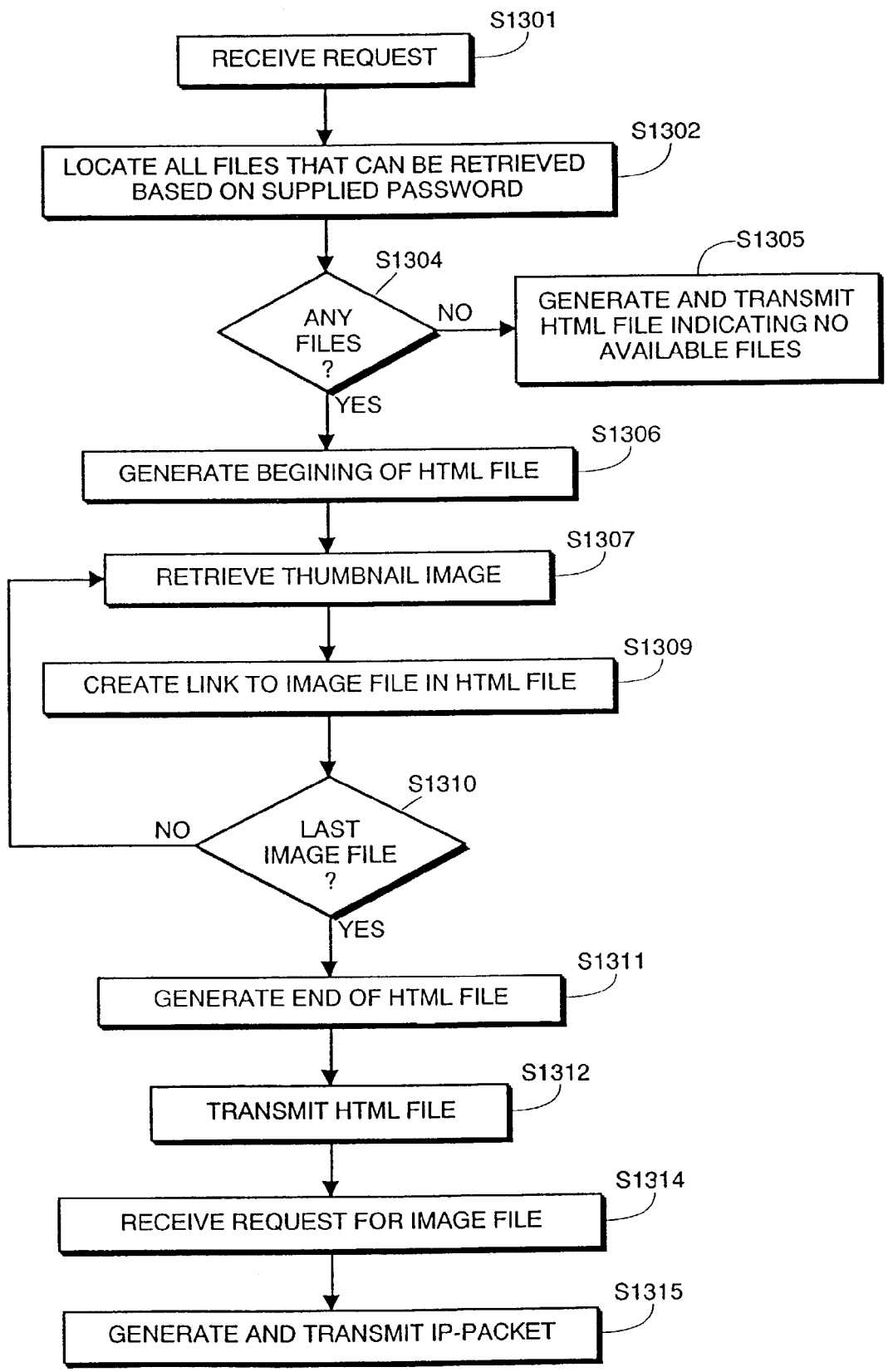
FIG. 13 is a flow diagram illustrating processing of web requests according to the second embodiment of the invention.

Processing for responding to a request over a TCP/IP network in the second embodiment will now be discussed with reference to FIGS. 11 and 13. FIG. 13 is a flow diagram illustrating servicing of a web request according to the second embodiment of the invention. Briefly, according to FIG. 13, a request is received, all files that can be retrieved based on a supplied password and user identification are located, the beginning of an HTML page is generated, a thumbnail image is retrieved and a link created for each retrievable file, the end of the HTML page is generated, and the HTML page is transmitted.

In more detail, in step S1301, an IP-packet is received by NEB 15. The IP-packet data field includes a request to return a particular web page. The request is transmitted to HTTP server 176 via the TCP/IP module 177 and LAN interface 179. In this embodiment, the web page name includes information identifying a user and a user password. For example, a requested web page might be in the form "Dan.21963", where "Dan" identifies the user and "21963" is a supplied password.

In step S1302, HTTP server 176 searches image information database 174, and locates all documents that can be retrieved based on the user information and password obtained, that is, all documents stored for the identified user that are accessible with the supplied password. For example, if the requested web page were Dan.21963, HTTP server 176 would identify all of Dan's documents that are accessible with password 21963. For each such file, HTTP server 176 retrieves the document identification portion (document ID) which indicates the storage locations of the thumbnail and full image GIF files.

In step S1304, HTTP server 176 determines whether any documents were located in step S1302. If not, then in step S1305 HTTP server 176 generates and transmits to the address indicated in the source field of the IP-packet containing the request an HTML page merely indicating that no files are available. Otherwise, processing proceeds to step S1306.

In step S1306, a standard beginning of an HTML file, such as beginning 201 shown in FIG. 7C, is generated.

In step S1307, HTTP server 227 accesses the first document ID code associated with the current user and password information. Based on the user ID, password and document ID, a retrieval path and filename is derived for the GIF file of the thumbnail image corresponding to that document, and that GIF file is retrieved. Specifically, HTTP server 176 retrieves the thumbnail image from file server 3.

In step S1309, HTTP server 176 generates HTML code to create a link to the full image GIF file using the pointer to that file obtained in step S1302. Actually, in the present embodiment two separate links are created, one using the document identification number and the other the retrieved thumbnail image, so that when displayed, the full image can be retrieved by double clicking on either the document ID or the thumbnail image. Examples of HTML code for such links, together with appropriate formatting codes, are reference numbers 202, 204 and 205, respectively, in FIG. 7C.

In step S1310, HTTP server 176 determines whether this is the last link to be generated, i.e., the last entry in image information database 225 for the current user ID and password. If not, processing returns to step S1307 to retrieve the thumbnail image corresponding to the next link. Thus, steps S1307, S1309 and S1310 generate links for all documents located in step S1302. When a link has been created for the last image file to be retrieved, processing proceeds to step S1311.

In step S1311, a standard HTML page ending, such as end 209 shown in FIG. 7C, is generated.

In step S1312, HTTP server 176 transmits the completed HTML page via TCP/IP protocol module 177 and LAN interface 179 to LAN 1. More specifically, TCP/IP protocol module 177 creates an IP-packet containing the HTML page in its data field and the address from the source field of the request IP-packet in its destination field, and LAN interface 179 causes the IP-packet to be transmitted over LAN 1. Depending on the contents of the destination field of the IP-packet, the IP-packet is either routed to a recipient on LAN 1 or is placed on World Wide Web 10 by router 9, where it is ultimately routed to its intended recipient.

When received by a web browser, the IP-packet generated according to the invention is read to display a web page including links to the image files corresponding to the user name and password information embedded in the request, similar to the first embodiment. However, in this embodiment, rather than being stored, the HTML pages are generated on-the-fly.

When a requester receives the web page sent in step S1312, he can click on one of the links to generate a TCP/IP packet requesting the full image file. Upon receipt of such an IP-packet in step S1314, processing proceeds to step S1315.

In step S1315, HTTP server 227 retrieves the requested document from file server 3, and then generates and transmits an IP-packet containing that file.

In order to obtain a recipient's image files according to this embodiment, a requester supplies an IP-packet for a web page corresponding to the recipient code and password. For example, for recipient code "Dan" and password "21963", a requester would enter at his browser the appropriate path name and the web page Dan.21963. In this way, the present embodiment can generate a web page based solely on the requested web page name.

In addition to reducing storage requirements and transmission times, generating HTML pages on-the-fly according to the invention permits more flexible password and user group techniques. According to one such technique, one database object would include a group name, a group password, and a list of pointers to user objects included in the group.

In the foregoing embodiment, new HTML files are generated on-the-fly. However, this embodiment can also be implemented by modifying existing HTML files as new facsimile documents are received and corresponding image files created, similarly to the first embodiment.

Third Embodiment

The third embodiment is identical to the second, except in this embodiment when a new image is input (i.e., when a facsimile is received) and the recipient code identified, an e-mail message containing a shortcut to the stored image is sent to the recipient. Thus, the third embodiment includes the additional step, following step S1209, of generating and transmitting an e-mail message to the recipient corresponding to the identified recipient code. The e-mail message includes an icon and serves as a shortcut to the GIF file corresponding to the full facsimile document, with the document ID included as shortcut name. More specifically, the e-mail message is sent out to LAN 1 via TCP/IP protocol module 229 and LAN interface 230. If the address information for the recipient is an internet address, then the e-mail message is routed to World Wide Web 10 via router 9.

Figure 14:
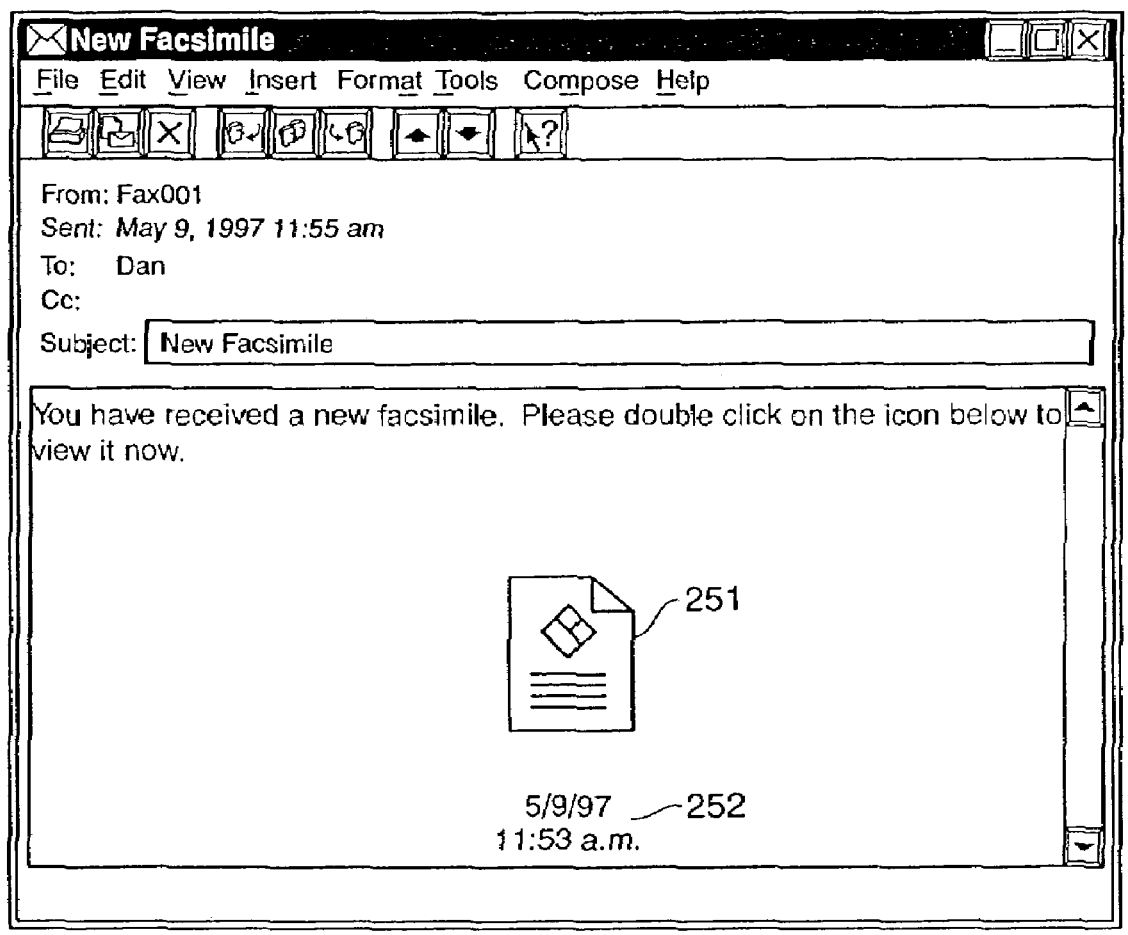
FIG. 14 illustrates an example of an e-mail message transmitted according to the third embodiment of the invention.
Figure 15:
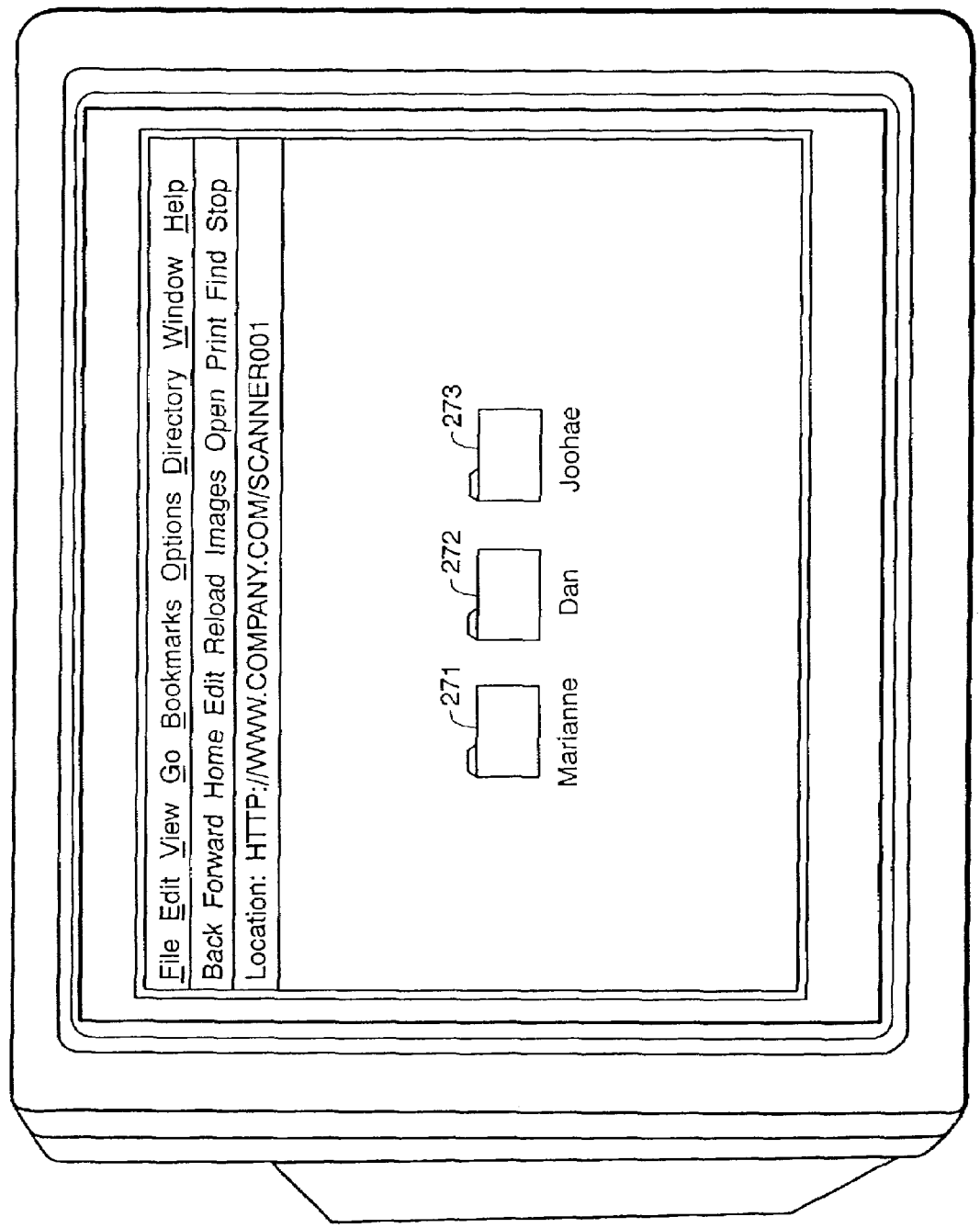
FIG. 15 illustrates a sample web page output when image links according to the invention are hierarchically grouped.

FIG. 14 illustrates a representative email message which can be transmitted according to this embodiment of the invention. As can be seen in FIG. 12, the e-mail message includes icon 251 and document ID 252 which together form a shortcut with an HTML link to the full facsimile document which was received May 9, 1997 at 11:53 a.m. and which lists Dan as the recipient.

The invention has been described with respect to particular illustrative embodiments. However, it is to be understood that the invention is not limited to the above-described embodiments. In this regard, the above embodiments describe certain features of the invention. However, those features are not limited to the embodiment in which they are described, but can be used in the other embodiment as well.

For instance, the above embodiments employ a scanner and a facsimile machine, respectively, as image input devices. However, other image input devices such as digital cameras and video cameras may also be used.

In addition, in the above embodiments a network interface board including an HTTP server is connected to the image input device via a hardwire connection. However, the HTTP server might instead be executed internally to the image input device or might be executed on a device which is connected to the image input device over a local area network, over a TCP/IP network or via a modem connection. Also, as noted above, the HTTP server might be implemented on a "web box" whose main purpose is to implement an HTTP server according to the invention.

Similarly, it is not necessary that the above-described functions be performed by any particular device, but instead may be performed by various combinations of connected devices. For example, a scanner might simply output a bitmap image file to a workstation, and the graphic format converter, with an image information database located on the workstation and a HTTP server executed on a network expansion board within the workstation. Similarly, rather than relying on a file server, a NEB executing an HTTP server according to the invention might be provided with its own disk drive for storage of image files.

In addition, although the above embodiments only describe generating an e-mail message in connection with a facsimile receipt, the e-mail message feature can be used for images input from other input devices, such as a scanner. Thus, for example, a similar e-mail message can be sent automatically to the user designated during the scanning operation.

Finally, in the above embodiments a request is made for a web page containing links to certain image files. However, as an intermediate step, a user might first request a web page showing a higher level of a hierarchical structure of document storage. For example, as shown in FIG. 13, a user might request a web page containing links to a number of different users, such as links 271, 272 and 273. Selecting a link, such as link 272, would initiate transmission of an IP-packet including a request for a web page containing all of Dan's image files. Other hierarchical levels, such as a level corresponding to the type of input image device, might also be used to organize input images. Such hierarchical arrangements can be implemented regardless of whether HTML pages are stored and modified or generated on-the-fly. However, in many cases on-the-fly generation will provide more flexibility in this regard.

In addition to the foregoing, various other changes and modifications may be made by those of ordinary skill in the art without departing from the spirit and scope of the invention.

What is claimed is:

1. A method of uploading image data, representing an image of a document, generated by scanning a hard copy of the document by an image scanning device in response to a request by a user at the image scanning device, the image data being uploaded to a file server connected to the image scanning device over a network, the method comprising:

scanning a hard copy of the document by the image scanning device, and generating image data by the image scanning device based on the scanned document;

the image scanning device obtaining user information, before the image scanning device scans the document, for identifying a user who manipulates the image scanning device from the user at the image scanning device;

uploading, by the image scanning device, the generated image data from the image scanning device to an area in the file server corresponding to the obtained user information via the network;

searching a Web server in the image scanning device for a Web page corresponding to the obtained user information;

in a case where the searching step determines that a Web page corresponding to the obtained user information exists in the Web server of the image scanning device, the image scanning device retrieving the Web page and modifying the Web page by generating markup language data containing link information for accessing the image data uploaded to the file server and adding the generated markup language to the retrieved Web page; and in a case where the searching step determines that a Web page corresponding to the obtained user information does not exist in the Web server of the image scanning device, the image scanning device generating a Web page corresponding to the obtained user information, generating markup language data containing link information for accessing the image data uploaded to the file server, adding the generated markup language to the generated Web page, and storing the Web page in the Web server in correspondence to the obtained user information, wherein the uploaded image data is accessible via the network at a network computer, by using a Web browser, in response to re-entry of the obtained user information and to designation of the link information in the markup language data.

2. A method according to claim 1, wherein a correspondence is created between the obtained user information and the uploaded image data, and wherein a page is displayed at the network computer in response to the re-entry of the obtained user information, the display page containing a selectable link to the uploaded image data.

3. A method according to claim 2, wherein the image data is accessed over the network by selecting the link displayed in the display page using the network computer.

4. A method according to claim 3, wherein the image data is retrieved from the file server and displayed by the network computer in response to selection of the link at the network computer.

5. A method according to claim 3, wherein the displayed link includes at least a portion of the obtained user information.

6. A method according to claim 3, wherein the displayed link is a name of a file containing the image data, a thumbnail image corresponding to the image data, or both.

7. A method according to claim 1, wherein information other than the obtained user information is automatically generated at the image scanning device.

8. A method according to claim 7, wherein the information automatically generated at the image scanning device is based on results of optical character recognition processing of recipient information in a header of the scanned document.

9. A method according to claim 7, wherein the information automatically generated at the image scanning device comprises a file name which is uploaded from the image scanning device to the file server.

10. A method according to claim 1, wherein a plurality of images are captured corresponding to the obtained user information and image data generated from the plurality of images is uploaded to the file server, the generated image data is accessible upon re-entry of the obtained user information.

11. A method according to claim 10, wherein a correspondence is created between the obtained user information and the generated image data, and wherein a page is displayed at the network computer in response to re-entry of the obtained user information, the display page containing a plurality of selectable links to the generated image data.

12. A method according to claim 1, further comprising:

identifying, at the image scanning device, a location for storing the generated image data based on the obtained user information, wherein the storage location identification is uploaded to the file server with the image data from the image scanning device.

13. A method according to claim 1, further comprising:

generating a thumbnail image using the generated image data; and uploading the generated thumbnail image with the generated image data from the image scanning device to the file server.

14. A method according to claim 1, further comprising:

automatically generating an electronic mail message, wherein the message includes a selectable link to the uploaded image data.

15. A method of uploading image data representing an image of a document, generated by scanning a hard copy of the document by an image scanning device in response to a request by a user at the image scanning device, the image data being uploaded to a file server connected to the image scanning device over a network, the method comprising:

scanning a hard copy of the document by the image scanning device, and generating image data by the image scanning device based on the scanned document, wherein the generated image data includes user information;

the image scanning device obtaining user information for identifying a user who manipulates the image scanning device from the scanned document;

uploading, by the image scanning device, the generated image data from the image scanning device to an area in the file server corresponding to the obtained user information via the network;

searching a Web server in the image scanning device for a Web page corresponding to the obtained user information;

in a case where the searching step determines that a Web page corresponding to the obtained user information exists in the Web server of the image scanning device, the image scanning device retrieving the Web page and modifying the Web page by generating markup language data containing link information for accessing the image data uploaded to the file server and adding the generated markup language to the retrieved Web page;

in a case where the searching step determines that a Web page corresponding to the obtained user information does not exist in the Web server of the image scanning device, the image scanning device generating a Web page corresponding to the obtained user information, generating markup language data containing link information for accessing the image data uploaded to the file server, adding the generated markup language to the generated Web page, and storing the Web page in the Web server in correspondence to the obtained user information.

wherein the uploaded image data is accessible via the network at a network computer, by using a Web browser, in response to re-entry of the obtained user information and to designation of the link information in the markup language data.

* * * * *